(12) United States Patent
Kupermann et al.

(10) Patent No.: US 9,836,113 B2
(45) Date of Patent: Dec. 5, 2017

(54) METHOD AND APPARATUS TO MANAGE POWER USAGE IN A PROCESSOR

(71) Applicant: Intel Corporation, Santa Clara, CA (US)

(72) Inventors: Eli Kupermann, Maale Adumim (IL); Rajasekaran Andiappan, Tampere (FI); Suryaprasad Kareenahalli, Folsom, CA (US); Yuli Barcohen, Nokdim (IL)

(73) Assignee: Intel Corporation, Santa Clara, CA (US)

( * ) Notice: Subject to any disclaimer, the term of this patent is extended or adjusted under 35 U.S.C. 154(b) by 739 days.

(21) Appl. No.: 14/138,564

(22) Filed: Dec. 23, 2013

(65) Prior Publication Data
US 2015/0177820 A1    Jun. 25, 2015

(51) Int. Cl.
*G06F 1/32* (2006.01)
(52) U.S. Cl.
CPC .......... *G06F 1/3293* (2013.01); *G06F 1/3206* (2013.01); *G06F 1/3275* (2013.01); *G06F 1/3287* (2013.01); *Y02B 60/1228* (2013.01); *Y02B 60/1282* (2013.01); *Y02B 60/32* (2013.01)
(58) Field of Classification Search
CPC ..... G06F 1/3293; G06F 1/3275; G06F 1/3287
See application file for complete search history.

(56) References Cited

U.S. PATENT DOCUMENTS

| | | |
|---|---|---|
| 2008/0098243 A1 | 4/2008 | Saewong et al. |
| 2008/0234935 A1 | 9/2008 | Wolf et al. |
| 2009/0024799 A1 | 1/2009 | Jahagirdar et al. |
| 2009/0204831 A1* | 8/2009 | Cousson ............... G06F 1/3203 713/322 |
| 2010/0058078 A1* | 3/2010 | Branover .............. G06F 1/3203 713/300 |
| 2010/0268930 A1* | 10/2010 | Bose ..................... G06F 1/3203 713/100 |
| 2011/0252255 A1* | 10/2011 | Safford ................. G06F 1/3203 713/320 |
| 2013/0073884 A1 | 3/2013 | Ulmer et al. |

OTHER PUBLICATIONS

European Patent Office, Extended European Search Report dated Jun. 1, 2015, in European Patent Application No. 14192164.3.

* cited by examiner

*Primary Examiner* — Nitin Patel
*Assistant Examiner* — Brandon Kinsey
(74) *Attorney, Agent, or Firm* — Trop, Pruner & Hu, P.C.

(57) ABSTRACT

In an embodiment, a processor includes first logic to determine first power to be provided to a first portion of a computational resource during a time period. The first portion may be reserved for execution by the processor of a first workload to be executed during the time period. The first power may be determined based at least in part on the first workload and independently of a second workload. The processor may include second logic to determine second power to be provided to a second portion of the computational resource during the time period. The second portion may be reserved for execution by the processor of the second workload during the time period. The second power may be determined based at least in part on the second workload and independently of the first workload.

18 Claims, 8 Drawing Sheets

METHOD AND APPARATUS TO MANAGE POWER USAGE IN A PROCESSOR

TECHNICAL FIELD

Embodiments relate to management of power usage in a processor.

BACKGROUND

In modern computational applications, a power budget of a processor may be a factor to consider in evaluation of overall effectiveness of the processor. In a computationally demanding environment, power constraints, e.g., battery capacity, length of time between battery recharge, thermal restrictions, and other factors may play a role in processor effectiveness.

Power-down of a processor when the processor is not in use can help to achieve operation of the processor within a designed power budget. In multipurpose applications, resources may be spread across different entities within the processor and it may not be possible to selectively power-down selected resources that are not used in an active application. Hence, power management of the processor may be performed in an "all or nothing" way, which may limit power savings opportunities to cases where there are no tasks to be accomplished.

DETAILED DESCRIPTION

Figure 1:
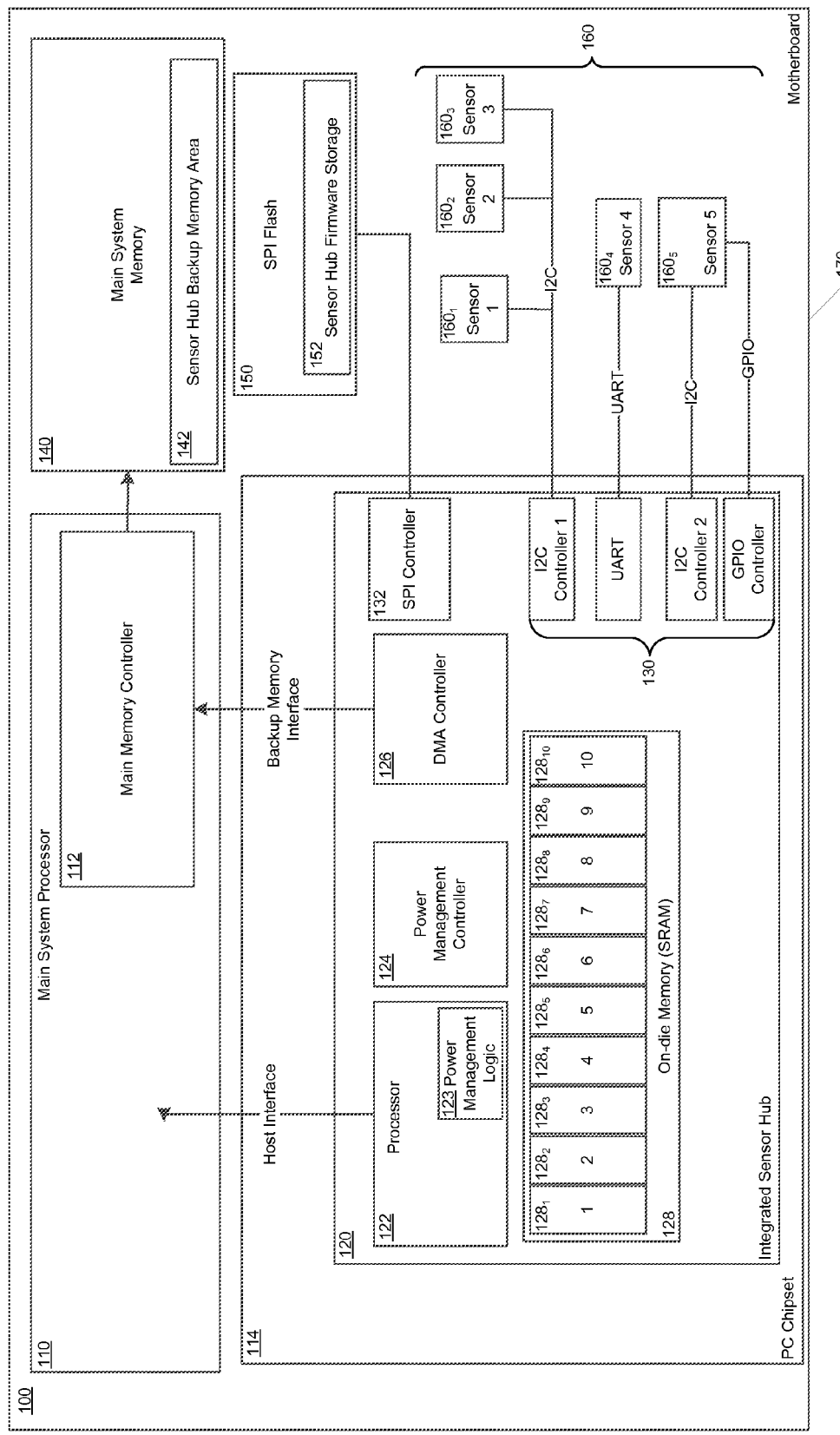
FIG. 1 is a block diagram of a system to manage power usage according to an embodiment of the present invention.

A system, such as an embedded system on a chip (SOC), may implement aggressive power savings to stay within its power budget. One solution to power management is to create a small footprint of a firmware image and to swap from a complete firmware image to the small footprint when a reduced set of functionality is required. However, this solution may not be effective for multipurpose systems, as it may be difficult to identify when a swap is possible to perform because applications would need to have mutual awareness of computational needs. Mutual awareness of computational needs by a plurality of applications is difficult to implement and maintain, especially when loads imposed by various applications change unpredictably.

Another solution to power management is to reduce power usage by shutting down unutilized system resources, such as one or more portions of on-chip memory. According to embodiments of the present invention, subsystems may be created that use isolated resources, and the subsystems may be run side-by-side. In some embodiments, the resources may be controlled via firmware (FW), which may eliminate a need for special hardware to manage the isolated resources. Traditional FW architecture may not allow clean isolation of data collection resources from processing resources (e.g., computational resources), and hence detection of processing inactivity and shutdown of processing-only memory might be difficult with traditional FW architecture.

In embodiments of the present invention, subsystems of a system may be independently controllable. The subsystems may include a first subsystem that is a large consumer of memory resources when active, and a second subsystem that is a small consumer of memory resources when active. When the first subsystem has no active tasks, the first subsystem can be shut down to save power without participation of the second subsystem or of a second subsystem power management in a decision as to whether to shut down the first subsystem. Idleness (e.g., no active tasks) of the first subsystem may be detected automatically, so there is no need to create mutual dependency between different applications that execute in different subsystems. In similar fashion, when the second subsystem is idle (e.g., has no active tasks) the second subsystem can be shut down to save power without participation of the first subsystem or first subsystem management in a decision as to whether to shut down the second subsystem.

For example, the first subsystem may be utilized only intermittently during a specified time period, e.g., to periodically process data that is being collected over the specified time period by the second subsystem. The second subsystem may, e.g., perform data collection, and may operate at a significantly higher sampling frequency as compared with a frequency of processing of the data that has been collected during the specified time period. The first subsystem may include a dedicated first portion of memory, e.g., a first portion of on-board static random access memory (SRAM) that is utilized only when the first subsystem executes a task, e.g., processing of data (e.g., pedometry data) collected during the specified time period. When the first subsystem is shut down, the first portion of SRAM may be shut down to save power. In some embodiments, a projected time period of idleness of the first subsystem may influence whether the first portion of SRAM is placed into a data retain state (reduced power usage) or a deep sleep state (powered-down, substantially zero power provided and substantially zero power usage). For example, in some instances the projected time period of idleness may result in the first portion of SRAM being placed into data retain state instead of deep sleep state because a power cost associated with complete shutdown of power to the first portion of SRAM and subsequent power-up of the first portion of SRAM may exceed power to be saved by placement of the first portion of SRAM in deep sleep instead of data retain state.

The second subsystem may include a dedicated second SRAM portion of the SRAM. While the second system is actively collecting the data (e.g. pedometry data), the second SRAM portion may be fully powered, independent of the first subsystem. When additional data is not being collected, the collected data may be retained in the second SRAM portion at a data retention power usage ("data retain state")

that is smaller than a full power level used by the second SRAM portion in active collection. When data is not being processed and data is not being collected, each of the first subsystem and the second subsystem, including the associated first SRAM portion and second SRAM portion, may be shut down ("deep sleep state") or may be placed into the data retain state. In some embodiments, a projected time period of idleness of the second subsystem may influence whether the second portion of SRAM is placed into the data retain state or the deep sleep state. There may be instances in which the projected time period of idleness may cause the second portion of SRAM to be placed into the data retain state instead of the deep sleep state, because a power cost associated with shutdown of power to the second portion of SRAM and subsequent power-up of the second portion of SRAM may exceed the power to be saved by placing the second portion of SRAM in the deep sleep state instead of the data retain state. Each of the first subsystem and the second subsystem may operate independently of one another with regard to a level of power to be provided to their respective resources, e.g., first portion and second portion of SRAM.

In an embodiment, a data collection domain is isolated from a data processing domain. The data collection domain may have its own dedicated part of SRAM, its own timers, and the data collection domain solely controls input/output (JO) and may receive from the processing subsystem requests for "one shot" or batch data collection. In one exemplary embodiment, the processing domain runs a 1 Hz timer for data processing while the data collection domain runs a 50 Hz timer for data collect. Therefore, a power management service of the processing subsystem "sees" only the 1 Hz timer and can decide to shut down the data processing subsystem between activity periods, e.g., at a shutdown frequency of 1 Hz. A power management service of the data collection subsystem may determine a level of power to be provided to the data collection subsystem independently of the power management service of the data processing subsystem.

FIG. 1 is a block diagram of a system 100 to manage power usage, according to an embodiment of the present invention. The system 100 includes a main system processor 110 that includes a main memory controller 112, a personal computer (PC) chipset 114 that includes an integrated sensor hub (ISH) 120, a main system memory 140, a serial peripheral interface (SPI) flash memory 150, and a set of sensors 160. In the embodiment shown in FIG. 1, the system 100 is located on a motherboard 170. In other embodiments (not shown), some portions of the system 100 may reside remotely.

In operation, the ISH 120 may receive sensor input from the set of sensors 160, one or more of sensors $160_1$, $160_2$, $160_3$, $160_4$, and $160_5$ sending data to the ISH 120 via a corresponding interface of a set of input interfaces 130. Input from the sensors 160 may be controlled by an SPI controller 132 that may run sensor firmware stored in sensor hub firmware storage 152 within the SPI flash memory 150. The sensor hub firmware storage 152 may also store power management firmware to be executed by a processor 122 to determine whether to provide full power, reduced power, or substantially zero power to various portions of an on-die static random access memory (SRAM) 128. In embodiments, the processor 122 includes power management logic 123, which may be circuitry to control power to processing resources. For example, the power management logic 123 may include first logic to control power to first processing resources (e.g., timers, some peripheral device drivers, a portion of the on-die SRAM 128, etc.) and second logic to control power to second processing resources (e.g., other timers, other peripheral device drivers, another portion of the on-die SRAM 128, etc.). In an embodiment, the power management logic 123 may execute the power management firmware to control power to various processing resources.

As data is received from the sensors 160, the data may be stored in the on-die SRAM 128. In embodiments of the present invention, data storage may be restricted to storage in a portion of the on-die SRAM 128, e.g., to memory bank $128_1$. In some embodiments, other memory banks, (e.g., some or all of memory banks $128_2$-$128_{10}$) may be reserved for data processing of the data stored in memory bank $128_1$.

The processor 122 (e.g., the power management logic 123 within the processor 122) may execute first firmware that is directed toward power management of actions related to data processing. The processor 122 (e.g., the power management logic 123 within the processor 122) may execute second firmware that is directed toward power management of actions related to data collection. In embodiments of the present invention, the power management of actions related to data collection may be handled independently of the power management of actions related to data processing of the collected data.

In an embodiment, the processor 122, through execution of the first firmware, determines whether to provide full power level, data retention power level (e.g., less than full power), or to power-down (e.g., to provide substantially zero power) to first processing resources including a first portion of the on-die SRAM 128 (e.g., banks $128_2$-$128_{10}$). The determination may be made through, e.g., evaluation of various factors including but not limited to a status of a data processing timer (not shown), and evaluation of various predictive techniques, e.g., heuristically based predictive techniques. If it is determined that the first portion of the on-die SRAM 128 is to be powered-down, data stored in the first portion may be off-loaded to, e.g., a sensor hub backup memory area 142 of the main system memory 140 via a direct memory access (DMA) controller 126 that can access the on-die SRAM 128 and can access the main memory controller 112 that can store the data received from the first portion of the on-die SRAM 128 into the main system memory 140.

The processor 122, through execution of the second firmware may determine, independently of the outcome of execution of the first firmware, whether to provide a full power level, data retention power level, or to shut down power, to second processing resources that may include a second portion of the on-die SRAM 128, e.g., bank $128_1$. The second portion of the on-die SRAM 128 may store data collected by, and received from, the sensors 160. The determination may be made through, e.g., evaluation of various factors including but not limited to a status of an associated data collection timer (not shown) and various predictive techniques. If it is determined that the power is to be shut down to the second portion of the on-die SRAM 128, data stored in the second portion (e.g. bank $128_1$) may be off-loaded to the sensor hub backup memory area 142 of the main system memory 140.

Each determination of power level to be provided to each of the first portion and the second portion of the on-die SRAM 128 may be made independently of the other determination, e.g., factors related to data collection activities do not influence the determination of power to be supplied to data processing-related hardware, and vice versa. Each determination may be based on factors associated with the actions that cause the data to be stored in the corresponding portion of the on-die SRAM 128. The determination of power level of each of the first portion and the second portion of the on-die SRAM 128 may be communicated to a power management controller 124, which may independently change the power supplied to one or each of the first and second portions of the on-die SRAM 128.

Figure 2:
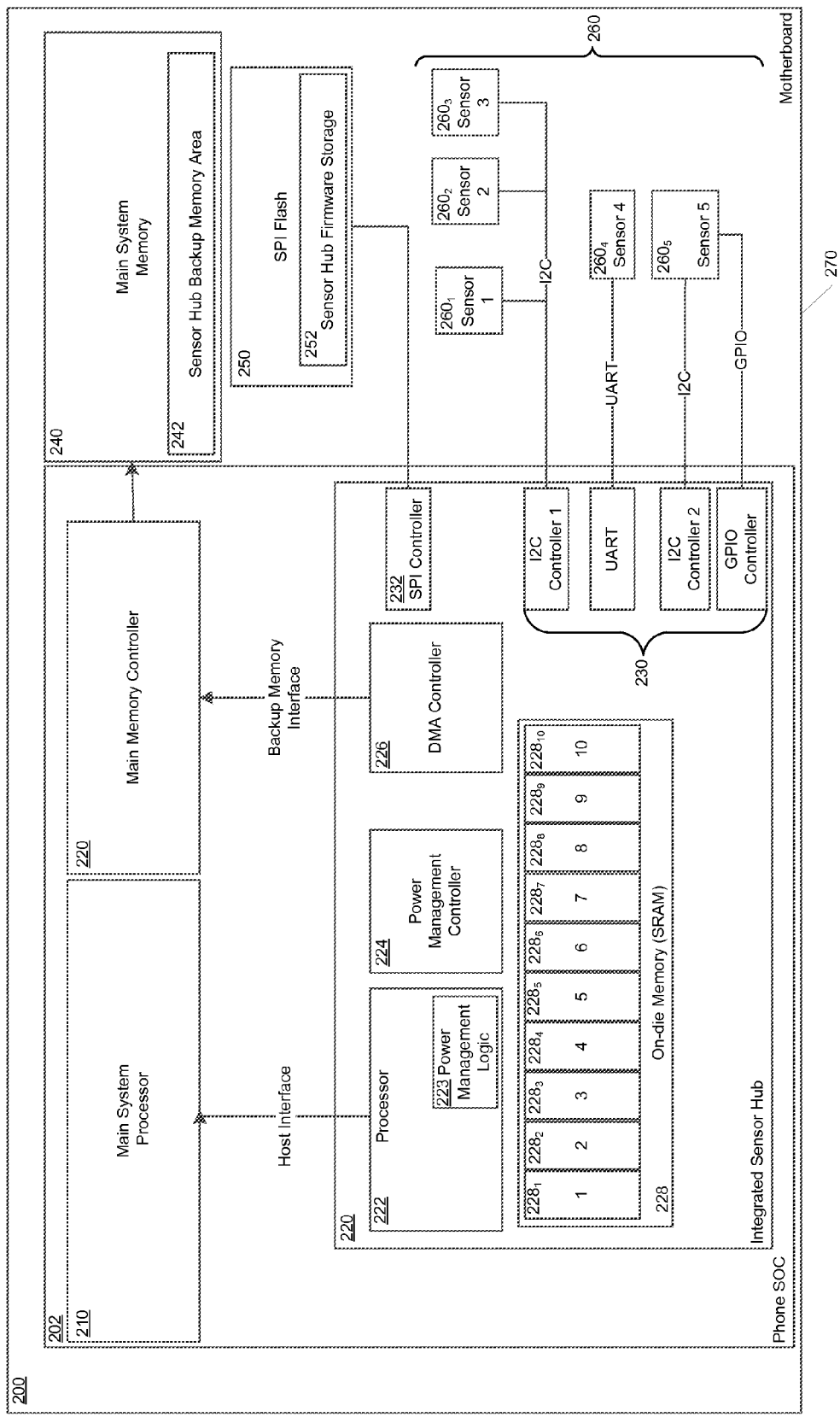
FIG. 2 is a block diagram of a system to implement power savings according to another embodiment of the present invention.

FIG. 2 is a block diagram of a system 200 to implement power savings, according to another embodiment of the present invention. The System 200 includes a phone system on a chip (SOC) 202 that includes a main system processor 210, a main memory controller 220, an integrated sensor hub (ISH) 220, a main system memory 240, a serial peripheral interface (SPI) flash memory 250, and a set of sensors 260. In the embodiment shown in FIG. 2, the system 200 is located on a motherboard 270. In other embodiments (not shown), some portions of the system 200 may reside remotely.

In operation, the ISH 220 may receive sensor input from the set of sensors 260 (e.g., $260_1$, $260_2$, $260_3$, $260_4$, $260_5$) each sensor sending data to the ISH 220 via a corresponding interface of a set of input interfaces 230. Input from the sensors 260 may be controlled by an SPI controller 232 that may run sensor firmware stored in sensor hub firmware storage 252 within the SPI flash memory 250. The sensor hub firmware storage 252 may also store power management firmware, which may be executed by a processor 222 to determine whether to provide full power, reduced power, or substantially no power to various processing resources including portions of an on-die static random access memory (SRAM) 228. In embodiments, the processor 222 includes power management logic 223, which may be circuitry to control power to the processing resources. For example, the power management logic 223 may include first logic to control power to first processing resources (e.g., timers, some peripheral device drivers, a portion of the on-die SRAM 228, etc.) and second logic to control power to second processing resources (e.g., other timers, other peripheral device drivers, another portion of the on-die SRAM 228, etc.). In an embodiment, the power management logic 223 may execute the power management firmware to control power to various processing resources. In embodiments, the power management logic 223 may include first logic to manage first power to a first set of processing resources and second logic to manage second power to a second set of processing resources.

As data (e.g., pedometry data) is received from one or more of the sensors 260, the data may be stored in the on-die SRAM 228. In embodiments of the present invention, data storage may be restricted to storage in a portion of the on-die SRAM 228, e.g., to a first memory bank $228_1$. In some embodiments, other memory banks (e.g., memory banks $228_2$-$228_{10}$) may be reserved for data processing of the data that is stored in the first memory bank $228_1$.

The processor 222 (e.g., the power management logic 223 within the processor 222) may execute first firmware that is directed toward power management of resources related to data processing (e.g. of pedometry data that has been collected). The processor 222 (e.g., the power management logic 223 within the processor 222) may execute second firmware that is directed toward power management of resources related to data collection (e.g., of pedometry data). In embodiments of the present invention, the power management of the resources associated with data processing may be handled independently of the power management of the resources associated with data collection.

In an embodiment, the processor 222, through execution of the first firmware, determines whether to provide full power level, data retention power level (e.g., less than full power), or to shut down power to first processing resources including a first portion of the on-die SRAM 228 (e.g., banks $228_2$-$228_{10}$). The determination may be made through, e.g., evaluation of various factors including but not limited to a status of a data processing timer (not shown) and may also be based on various predictive techniques (e.g., heuristic predictive techniques). If it is determined that the power is to be shut down to the first portion of the on-die SRAM 228, data stored in the first portion may be off-loaded to a sensor hub backup memory area 242 of the main system memory 240 via a direct memory access (DMA) controller 226 that accesses the on-die SRAM 228, and via the main memory controller 212.

The processor 222, through execution of the second firmware, may determine, independently of the outcome of execution of the first firmware, whether to provide full power level, data retention power level, or to power-down second processing resources including a second portion of the on-die SRAM 228 (e.g., bank $228_1$) that stores data (e.g., pedometry data) collected by and received from the sensors 260. The determination may be made through, e.g., evaluation of various factors including but not limited to a status of a data collection timer (not shown) and evaluation of predictive techniques. If it is determined that the power is to be shut down to the second portion of the on-die SRAM 228, data stored in the second portion e.g. $228_1$ may be off-loaded to the sensor hub backup memory area 242 prior to shut-down of the second portion of the on-die SRAM 228.

Each determination of the power level to be provided to the respective portion of the on-die SRAM 228 may be made independently of the other determination, e.g., no factors related to data processing activities influence the determination of power to be supplied to data collection-related hardware, and vice versa. Each determination may be based on factors associated with the actions that produce the data stored in the corresponding portion of the on-die SRAM 228, e.g., predicted time periods of idleness. The determination of power level of each of the first portion and the second portion of the on-die SRAM 228 may be independently communicated to a power management controller 224, which may change the power supplied to one or both of the first and second portions of the on-die SRAM 228.

Figure 3:
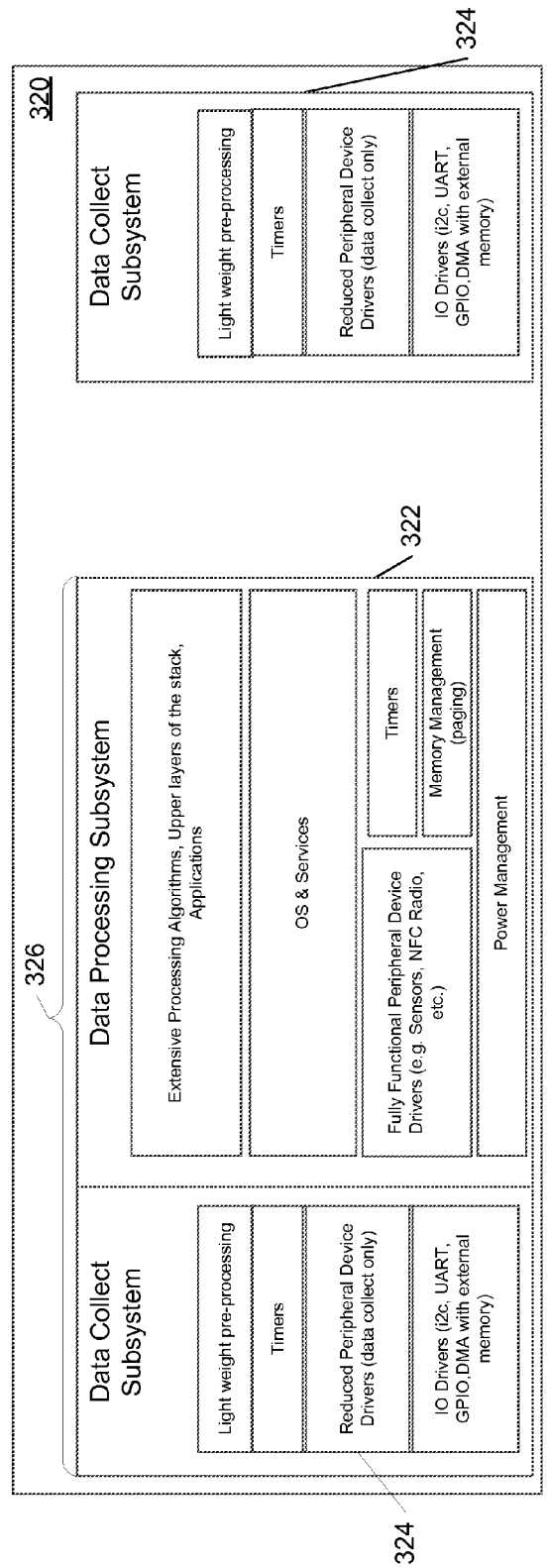
FIG. 3 is a block diagram of a scheme to manage power used by a processor, according to embodiments of the present invention.

FIG. 3 is a block diagram of a scheme to manage power used by a processor, according to embodiments of the present invention. In a scheme 320, a data processing subsystem 322 runs independently of a data collect subsystem 324. In full operation 326 (left side of scheme 320), both data processing subsystem 322 and data collect subsystem 324 are operable, e.g., full power is supplied to the data processing subsystem 322 and the data collect subsystem 324. The data processing subsystem 322 may have a respective isolated resource set that may include a portion of on-board memory, e.g., a first portion of on-board SRAM. The data collect subsystem 324 may include a second portion of on-board SRAM. When data processing is idle (right side of scheme 320), the data processing hardware is in an idle state. The data processing subsystem 322 may be shut down (e.g., disconnected to save power) and the first portion of SRAM may be powered down or may remain in a data retain state, depending upon a projected length of time of the idle state of data processing. The second subsystem 324 (right side of 320) may remain powered when data collection is active, and may fully power the second portion of on-board SRAM during data collection, or may reduce or power-down the second portion of on-board SRAM during times when data is not being collected. The first subsystem 322 and the second subsystem 324 may operate independently of one another, which may eliminate a need to transfer information pertaining to, e.g., which sensors to poll, which data has been collected, a decision of when to enact a swap, etc.

Figure 4:
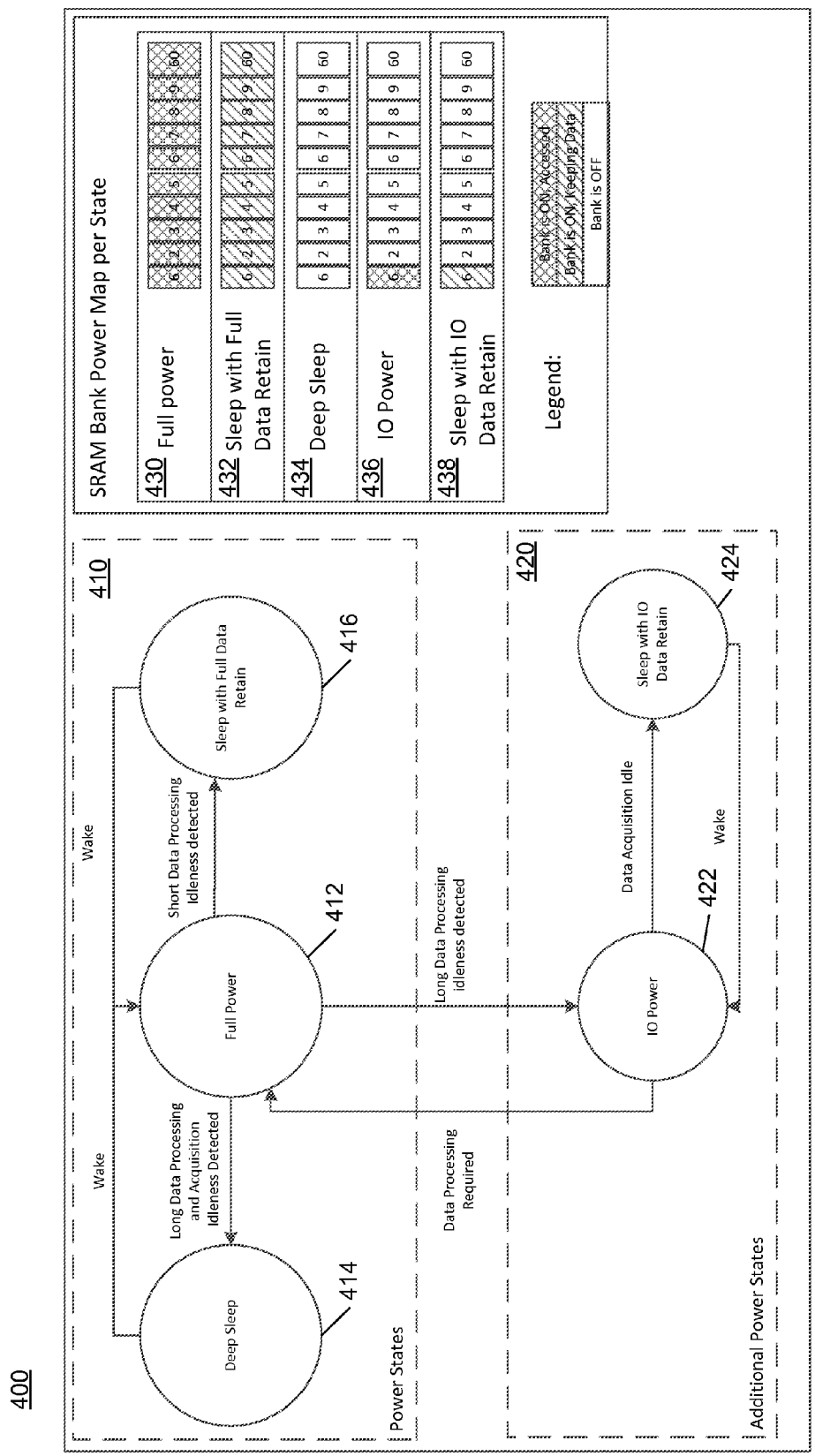
FIG. 4 is a state diagram that depicts various states of a system, according to embodiments of the present invention.

FIG. 4 is a state diagram that depicts various states of a system, according to embodiments of the present invention. Region 410 depicts three states of power usage by a data collection and data processing system. In a full power state 412, data collection and data processing are executed concurrently, and associated resources for each task (e.g., SRAM portion dedicated to each task) are fully powered, as is indicated in a full power bank map 430. In a deep sleep state 414, data collection and data processing tasks are idle, and the associated resources for each task (e.g., SRAM portions) are powered down, as shown in deep sleep bank power map 434. The deep sleep state 414 may be invoked based on indications (e.g., predictions based on heuristics, impending workloads, and other factors) of an impending long period of idleness of all subsystems. A sleep with full data retain state 416 may be invoked based on an indication that a short data processing period of idleness of all subsystems is expected, and power usage is shown in SRAM bank power map 432. Sleep with full data retain 416 may be invoked, e.g., when a power cost associated with powerdown and subsequent power-up of the associated resources of a particular task exceeds the power cost associated with full data retain.

Additional power states are shown in region 420. In an IO power state 422, the portion of associated resources allocated for data processing (e.g., SRAM portion of on-board SRAM allocated to data processing) is shut down due to an idle state of the data processing function and an expectation of a prolonged idle state of the data processing function (e.g., determined by heuristics, impending work load, and other factors). Data acquisition continues in the IO power state 422, and so associated resources for data acquisition (e.g., data acquisition SRAM portion) are fully powered while resources for data processing are powered-down, as shown in IO power map 436.

In a sleep with IO data retain state 424, the data processing resources (e.g., SRAM portion allocated to data processing) are powered-down while power to the data collection resources (e.g., SRAM portion allocated to data collection) is reduced from full power to a data retain power level. The sleep with IO data retain state 424 may be invoked if data processing is projected to be idle for a long period of time and data acquisition is projected to be idle for only a brief period of time (e.g., power-down and subsequent power-up costs exceed data retain power cost). A sleep with JO data retain map 438 illustrates the power to be provided to the SRAM.

The additional power states 422 and 424 may result in reduction of power usage by the resources such as SRAM because these power states represent intermediate power usage between full power and deep sleep. The additional power states 422 and 424 may be invoked responsive to various work load conditions so as to consume less than full power, e.g., when one or more portions of the data acquisition and data processing systems are in a reduced state of utilization.

Figure 5:
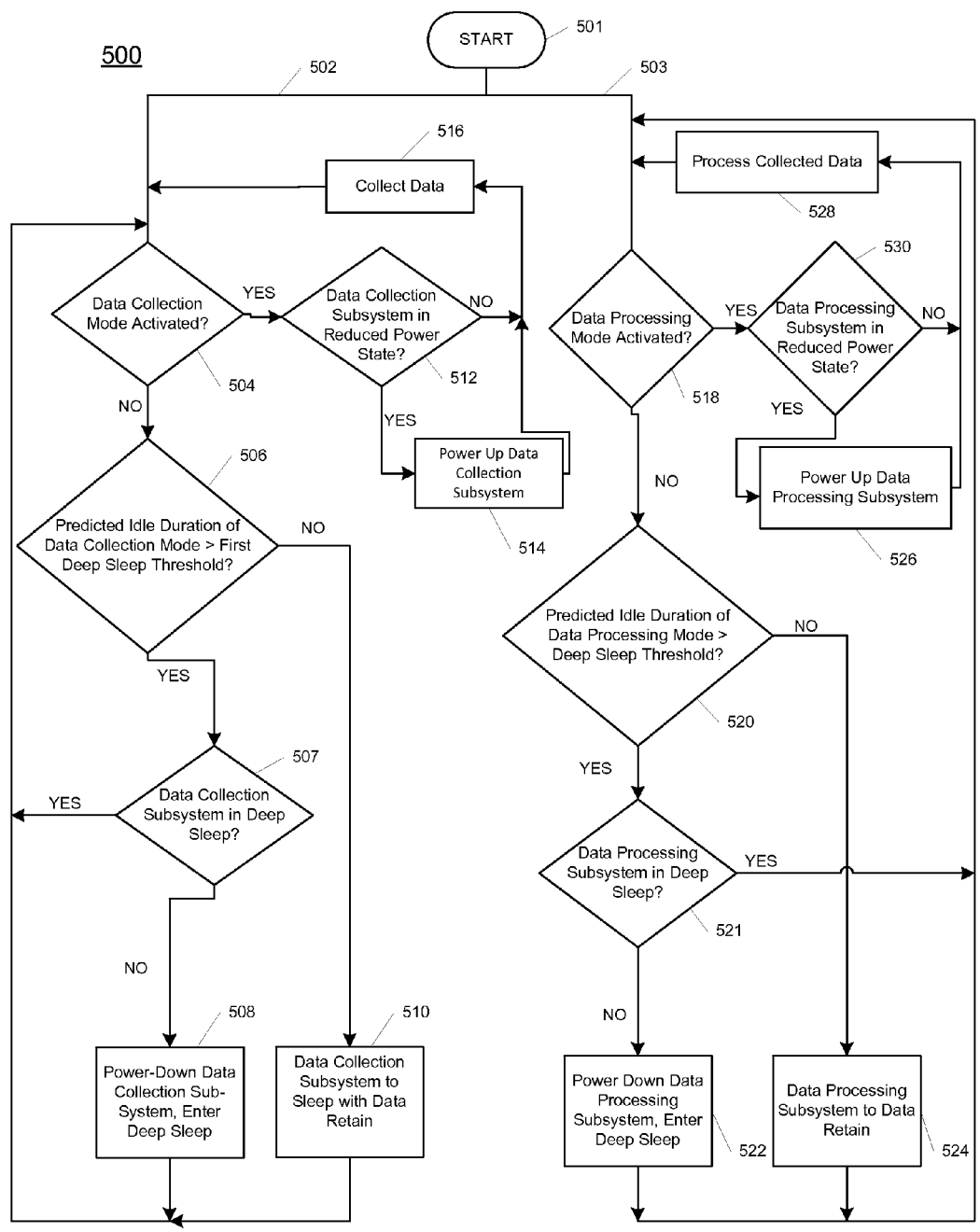
FIG. 5 is a flow diagram of a method of managing power usage in a processor, according to an embodiment of the present invention.

FIG. 5 is a flow diagram of a method that may be performed by a processor (e.g. processor 122 of FIG. 1 or processor 222 of FIG. 2) to manage power usage in a system, according to an embodiment of the invention. The method begins at block 501 and splits into two branches, 502 and 503.

Taking a left branch 502 (e.g., data collection), at decision diamond 504 it is determined whether a data collection mode is activated. If the data collection mode is activated, continuing to decision diamond 512 if a data collection subsystem is in a reduced power state (e.g., data retain or powered-down), advancing to block 514 the data collection subsystem is powered up, e.g., to full power. Proceeding to block 516, data is to be collected by the data collection subsystem (e.g., via sensors, to be stored in a data collection SRAM portion). If the data processing subsystem is at full power, proceeding from decision block 512 to block 516, data is to be collected by the data collection subsystem. Back at decision diamond 504, if at some point data collection is idled, moving to decision diamond 506 it is determined whether a predicted idle duration of the data collection mode is greater than a first threshold (e.g., a first deep sleep threshold such as a first pre-set time period). If the predicted idle duration exceeds the first threshold, advancing to decision diamond 507, if the data collection sub-portion of the system is already in deep sleep, returning to decision diamond 504 if the data collection mode is again activated the method proceeds to decision diamond 512. Back at decision diamond 507, if the data collection sub-portion of the system is not in deep sleep, proceeding to block 508, the data collection sub-portion is powered down to enter deep sleep. If, back at decision diamond 506, if the predicted idle duration of data processing is less than or equal to the deep sleep threshold, proceeding to block 510 power to the data collection sub-portion is reduced to data retain level, and returning to decision diamond 504, when the data collection is again activated the method advances to decision diamond 512 to again power up the data collection sub-portion to full power.

Taking a right branch 503 (e.g., data processing), at decision diamond 518 it is determined whether a data processing mode is activated. If the data processing mode is activated, continuing to decision diamond 530 if the data processing subsystem is in a reduced power state (e.g., data retain or powered-down), advancing to block 526 the data processing subsystem is powered up to full power. Proceeding to block 528, collected data is processed by the data processing subsystem. If the data processing subsystem is at full power, proceeding from decision block 530 to block 528, collected data is processed by the data processing subsystem. Continuing to decision diamond 518, if at some point the data processing subsystem is idled, moving to decision diamond 520 it is determined whether a predicted idle duration of data processing is greater than a second threshold (e.g., a second deep sleep threshold such as a second pre-set time period). If the predicted idle duration exceeds the second threshold, advancing to decision diamond 521, if the data processing sub-portion of the system is already in deep sleep mode, returning to decision diamond 518 if the data processing is again activated the method proceeds to decision diamond 530. Back at decision diamond 521, if the data processing sub-portion of the system is not in deep sleep mode, proceeding to block 522, the data processing sub-portion is completely powered down to enter data processing deep sleep. If, back at decision diamond 520, if the predicted idle duration of the data process mode is less than or equal to the second threshold, proceeding to block 524 power to the data processing sub-system is reduced to a data retain level, and returning to decision diamond 518 when the data processing is again activated the method advances to decision diamond 530 to again power up the data processing sub-portion to full power.

Figure 6:
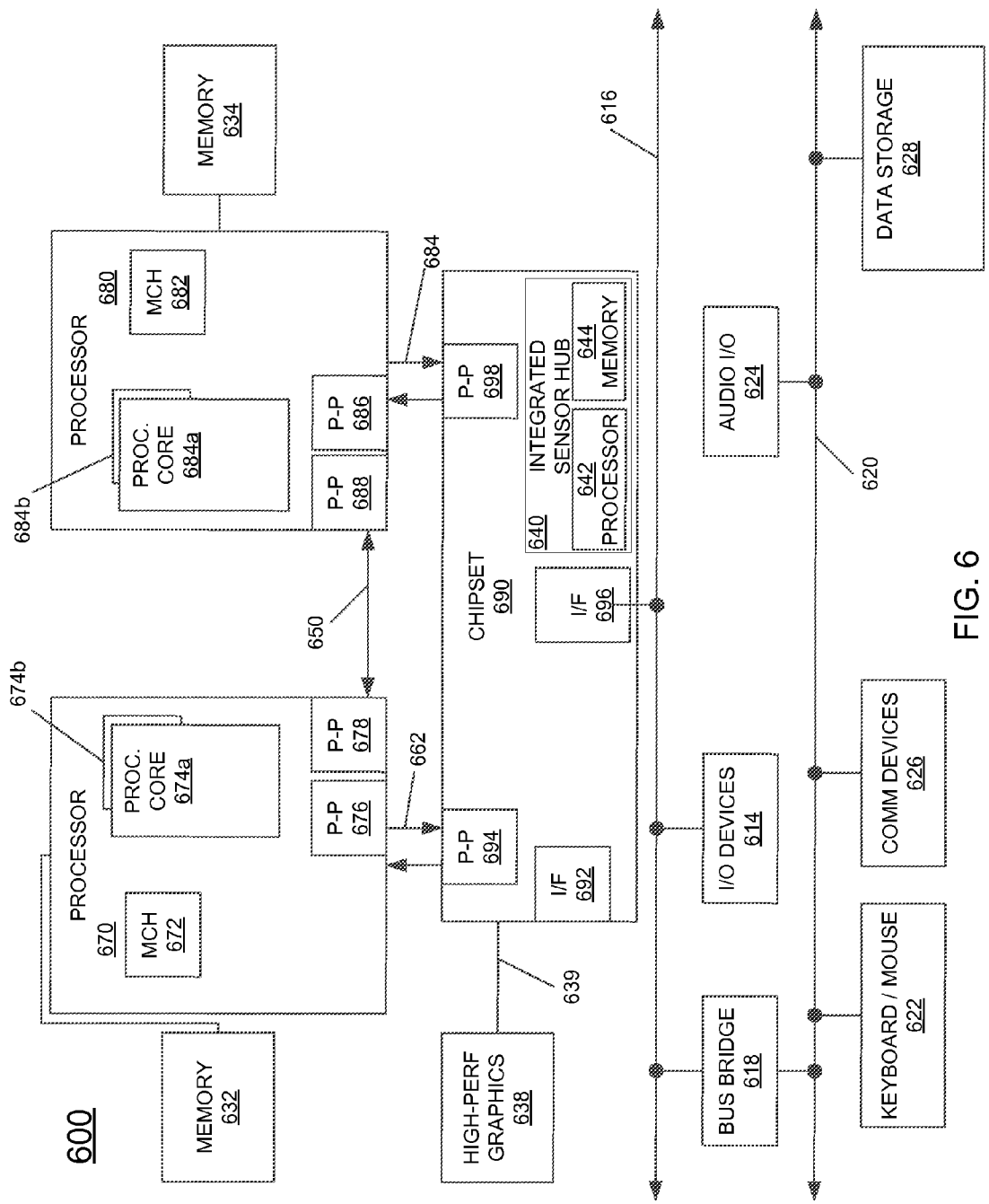
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. Each of the processors may include a data cache (not shown).

First processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCHs 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 684, respectively. As shown in FIG. 6, chipset 690 includes P-P interfaces 694 and 698. The chipset 690 may also include an integrated sensor hub (ISH) 640 that may include a processor 642 and on-board memory 644 (e.g., SRAM). The processor 642 may be configured to determine first power to a first subset of processing resources. The first subset may include a first portion of the on-board memory 644, the first memory portion associated with a first task (e.g. processing of collected data). The processor 642 may be configured to determine second power to a second subset of the processing resources. The second subset may include a second memory portion (e.g., for storage of the collected data), of the on-board memory 644 as in embodiments of the present invention. The first power to be provided may be determined based at least in part on a length of idle time (idleness) associated with the data processing. The second power to be provided may be determined based at least in part on a length of idle time associated with the data collection. Decisions by the processor 642 regarding a level of power to be provided to the first subset of processing resources (including the first memory portion of the on-board memory 644) or to the second subset of processing resources (including the second memory portion of the on-board memory 644) may be made independently of the other sub-portion, e.g., the power level to be provided to the first subset may be determined independently of the power level to be provided to the second subset, according to embodiments of the present invention.

Furthermore, chipset 690 includes an interface 692 to couple chipset 690 with a high performance graphics engine 638 by a P-P interconnect 639. In turn, chipset 690 may be coupled to a first bus 616 via an interface 696. As shown in FIG. 6, various input/output (I/O) devices 614 may be coupled to first bus 616, along with a bus bridge 618, which couples first bus 616 to a second bus 620. Various devices may be coupled to second bus 620 including, for example, a keyboard/mouse 622, communication devices 626 and a data storage unit 628 such as a disk drive or other mass storage device. Further, an audio I/O 624 may be coupled to second bus 620. Embodiments can be incorporated into other types of systems including mobile devices such as a smart cellular telephone, Ultrabook™, tablet computer, netbook, or so forth.

Figure 7:
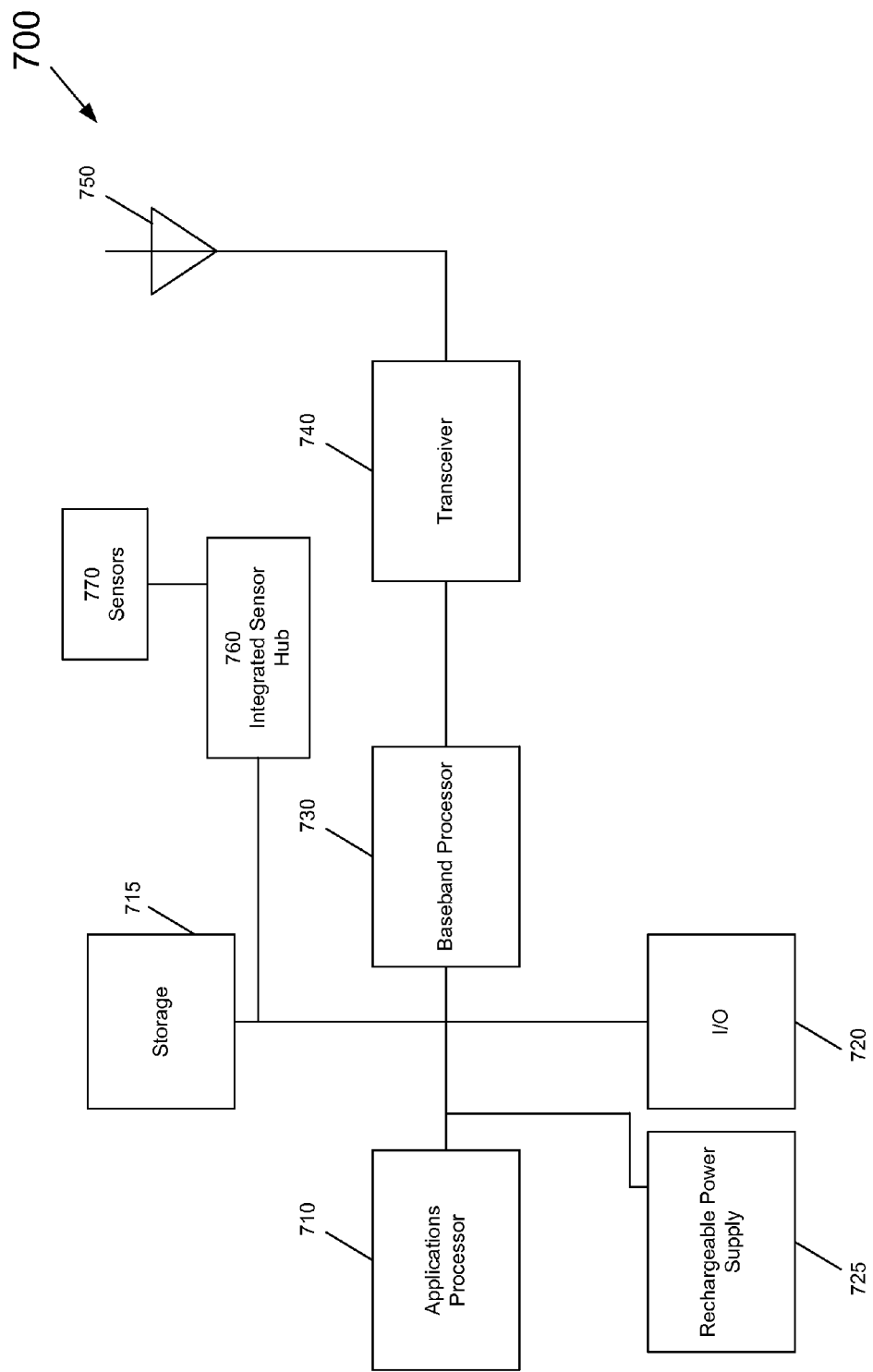
FIG. 7 is a block diagram of a system in accordance with another embodiment of the present invention.

Embodiments can be incorporated into other types of systems including mobile devices such as a cellular telephone. Referring now to FIG. 7, shown is a block diagram of a system in accordance with another embodiment of the present invention. As shown in FIG. 7, system 700 may be a mobile device and may include various components. As shown in the high level view of FIG. 7, an applications processor 710, which may be a central processing unit of the device, is in communication with various components, including a storage 715. Storage 715, in various embodiments, may include both program and data storage portions and can be mapped to provide for secure storage. Applications processor 710 may further be coupled to an input/output system 720, which in various embodiments may include a display and one or more input devices such as a touch keypad, which itself can appear on the display when executed. The system 700 may also include an integrated sensor hub (ISH) 760 that may include a processor (not shown) that may include power management logic, on-board memory, e.g., SRAM memory (not shown), a power management controller (not shown), and a DMA controller (not shown), in accordance with embodiments of the present invention. The ISH 760 may receive data from one or more sensors 770, and the processor of the ISH 760 may be configured to determine a level of power to be provided to subsets of processing resources including a first subset that includes a first portion of the on-board memory, the power level based on a predicted level of activity associated with the subset of processing resources, in accordance with embodiments of the present invention. For example, a first subset of processing resources may include a first portion of the on-board memory that may be allocated for data processing of collected data received from the sensors 770. A second subset of processing resources may include a second portion of the on-board memory that may be allocated for storage of the collected data that is received from the sensors 770. The respective power to be provided to each subset of the processing resources may be dependent on a corresponding predicted idleness for a time period, in accordance with embodiments of the present invention.

Applications processor 710 also may couple to a baseband processor 730, which may condition signals such as voice and data communications for output, as well as conditioning incoming telephone and other signals. As seen, baseband processor 730 couples to a transceiver 740, which may enable both receive and transmit capabilities. In turn, transceiver 740 may be in communication with an antenna 750, e.g., any type of antenna capable of transmitting and receiving voice and data signals via one or more communication protocols such as via a wireless wide area network (e.g., a 3G or 4G network) and/or a wireless local area network, such as a BLUETOOTH™ or so-called WI-FI™ network in accordance with an Institute of Electrical and Electronics Engineers 802.11 standard. As seen, system 700 may further include a rechargeable power supply 725 having a rechargeable battery to enable operation in a mobile environment. While shown with this particular implementation in the embodiment of FIG. 7, the scope of the present invention is not limited in this regard.

Figure 8:
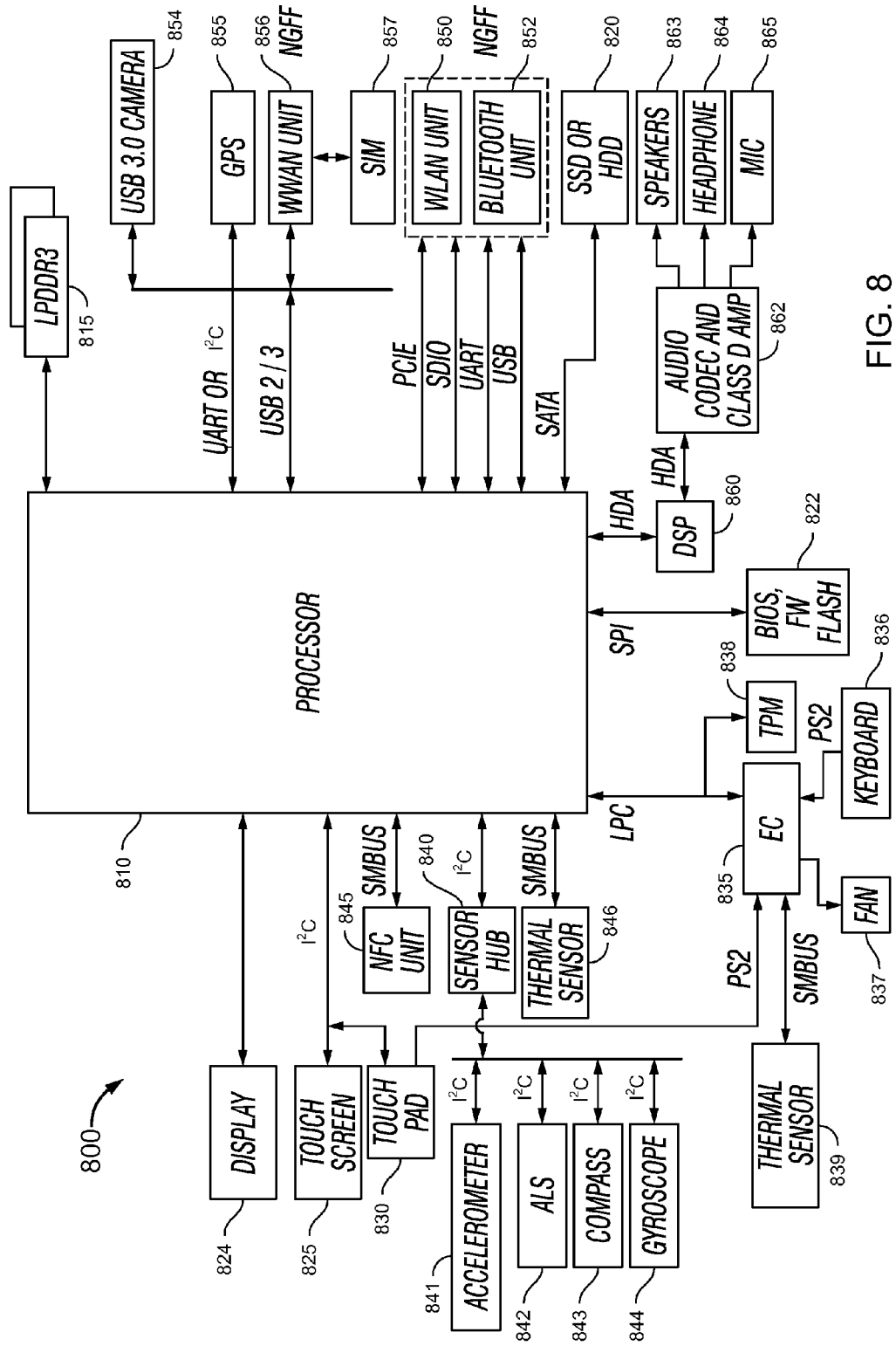
FIG. 8 is a block diagram of components present in a computer system in accordance with an embodiment of the present invention.

FIG. 8 is a block diagram of components present in a computer system in accordance with an embodiment of the present invention. Referring now to FIG. 8, shown is a block diagram of components present in a computer system in accordance with an embodiment of the present invention. Such a system may be used in any of the nodes described herein such as kiosk nodes, Smartphones, tablets, mobile computing nodes, servers, and the like. As shown in FIG. 8, system 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that the block diagram of FIG. 8 is intended to show a high level view of many components of the computer system. However, it is to be understood that additional components may be present in certain implementations and furthermore, different arrangement of the components shown may occur in other implementations.

As seen in FIG. 8, a processor 810, which may be a low power multicore processor socket such as an ultra-low voltage processor, may act as a main processing unit and central hub for communication with the various components of the system. Such processor can be implemented as a system on a chip (SoC) as described herein. In one embodiment, processor 810 may be an Intel® Architecture Corer™-based processor such as an i3, i5, i7 or another such processor available from Intel Corporation, Santa Clara, Calif., such as a processor that combines one or more Core™-based cores and one or more Intel® ATOM™-based cores to thus realize high power and low power cores in a single SoC. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 or A6 processor.

Processor 810 may communicate with a system memory 815, which in an embodiment can be implemented via multiple memory devices to provide for a given amount of system memory. To provide for persistent storage of information such as data, applications, one or more operating systems and so forth, a mass storage 820 may also couple to processor 810. Also shown in FIG. 8, a flash device 822 may be coupled to processor 810 (e.g., via a serial peripheral interface (SPI)). This flash device may provide for non-volatile storage of system software, including a basic input/output software (BIOS) as well as other firmware of the system.

Various input/output (IO) devices may be present within system 800. Specifically shown in the embodiment of FIG. 8 is a display 824 which may be a high definition LCD or LED panel configured within a lid portion of the chassis. This display panel may also provide for a touch screen 825, e.g., adapted externally over the display panel such that via a user's interaction with this touch screen, user inputs can be provided to the system to enable desired operations (e.g., with regard to the display of information, accessing of information and so forth). In one embodiment, display 824 may be coupled to processor 810 via a display interconnect that can be implemented as a high performance graphics interconnect. Touch screen 825 may be coupled to processor 810 via another interconnect, which in an embodiment can be an I$^2$C interconnect. As further shown in FIG. 8, in addition to touch screen 825, user input by way of touch can also occur via a touch pad 830 which may be configured within the chassis and may also be coupled to the same I$^2$C interconnect as touch screen 825.

For perceptual computing and other purposes, various sensors may be present within the system and can be coupled to processor 810 in different manners. Certain inertial and environmental sensors may couple to processor 810 through an integrated sensor hub (ISH) 840, e.g., via an I2C interconnect. In the embodiment shown in FIG. 8, these sensors may include an accelerometer 841, an ambient light sensor (ALS) 842, a compass 843 and a gyroscope 844. Other environmental sensors may include one or more thermal sensors 846 which may couple to processor 810 via a system management bus (SMBus) bus, in one embodiment. The ISH 840 may include on-die memory (not shown, e.g., on-die SRAM). The ISH 840 may include a processor (not shown) to determine a corresponding power to be supplied to each of a plurality of subsets of processing resources including memory portions of on-die memory (not shown), where the corresponding power may be determined for each portion independent of other portions, according to embodiments of the present invention. The power to be supplied to each subset of the processing resources may be based on an associated activity level of a task that uses the corresponding subset, according to embodiments of the present invention. For example, the power to be provided to a particular portion of the on-board memory within the ISH 840 may be determined at least in part based on activity level (e.g., expected workload) and other prediction techniques of activities that use the portion of the on-board memory, according to embodiments of the present invention. The power to be provided to each portion may be a full power, a data retain power, or the portion may be powered-down, and the power to be provided to one subset (including power to be provided to each portion of the on-board memory) may be determined independently of the activity level associated with other subsets of the processing resources, according to embodiments of the present invention.

Also seen in FIG. 8, various peripheral devices may couple to processor 810 via a low pin count (LPC) interconnect. In the embodiment shown, various components can be coupled through an embedded controller 835. Such components can include a keyboard 836 (e.g., coupled via a PS2 interface), a fan 837, and a thermal sensor 839. In some embodiments, touch pad 830 may also couple to EC 835 via a PS2 interface. In addition, a security processor such as a trusted platform module (TPM) 838 in accordance with the Trusted Computing Group (TCG) TPM Specification Version 1.2, dated Oct. 2, 2003, may also couple to processor 810 via this LPC interconnect.

System 800 can communicate with external devices in a variety of manners, including wirelessly. In the embodiment shown in FIG. 8, various wireless modules, each of which can correspond to a radio configured for a particular wireless communication protocol, are present. One manner for wireless communication in a short range such as a near field may be via a near field communication (NFC) unit 845 which may communicate, in one embodiment with processor 810 via a SMBus. Note that via this NFC unit 845, devices in close proximity to each other can communicate. For example, a user can enable system 800 to communicate with another portable device such as a Smartphone of the user via adapting the two devices together in close relation and enabling transfer of information such as identification information payment information, data such as image data or so forth. Wireless power transfer may also be performed using a NFC system.

As further seen in FIG. 8, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth unit 852, short range communications via a Bluetooth protocol can occur. These units may communicate with processor 810 via, for example, a USB link or a universal asynchronous receiver transmitter (UART) link. Or these units may couple to processor 810 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the next generation form factor (NGFF) connectors adapted to a motherboard.

In addition, wireless wide area communications (e.g., according to a cellular or other wireless wide area protocol) can occur via a WWAN unit 856 which in turn may couple to a subscriber identity module (SIM) 857. In addition, to enable receipt and use of location information, a GPS module 855 may also be present. Note that in the embodiment shown in FIG. 8, WWAN unit 856 and an integrated capture device such as a camera module 854 may communicate via a given USB protocol such as a USB 2.0 or 3.0 link, or a UART or I2C protocol. Again the actual physical connection of these units can be via adaptation of a NGFF add-in card to an NGFF connector configured on the motherboard.

To provide for audio inputs and outputs, an audio processor can be implemented via a digital signal processor (DSP) 860, which may couple to processor 810 via a high definition audio (HDA) link. Similarly, DSP 860 may communicate with an integrated coder/decoder (CODEC) and amplifier 862 that in turn may couple to output speakers 863 which may be implemented within the chassis. Similarly, amplifier and CODEC 862 can be coupled to receive audio inputs from a microphone 865 which in an embodiment can be implemented via dual array microphones to provide for high quality audio inputs to enable voice-activated control of various operations within the system. Note also that audio outputs can be provided from amplifier/CODEC 862 to a headphone jack 864. Although shown with these particular components in the embodiment of FIG. 8, understand the scope of the present invention is not limited in this regard.

While FIG. 8 includes display 824, other nodes or systems for use with embodiments of the invention do not necessarily include a display and/or I/O display. Such a device lacking a display may still interact with, for example, another node having a display. The device lacking the display may still convey information to the node having the display and the information may still be displayed on the display. In fact, the system may lack displays for either the node delivering the information or the node receiving the information. The node receiving the information may convert the information into audio (e.g., reading aloud text transferred between the nodes), simply store the information (e.g., to perform automatic archiving for a user), and the like. The display in question may be a heads up display, hologram, and the like.

Other embodiments are described below.

In a first example, a processor includes first logic to determine first power to be provided to a first portion of a computational resource during a time period, the first portion to be reserved for execution by the processor of a first workload during the time period. The first power may be determined based at least in part on the first workload and independently of a second workload. The processor also includes second logic to determine second power to be provided to a second portion of the computational resource during the time period. The second portion may be reserved for execution by the processor of the second workload during the time period, and the second power may be determined based at least in part on the second workload and independently of the first workload. The first power may be a selectable one of full power, data retain power that is smaller than full power and greater than zero power, and substantially zero power. In an embodiment of the first example, the first power may be selected based at least in part on a comparison of a first idle time associated with execution of the first workload, to a first deep sleep threshold. Optionally, the first portion of the computational resource includes a first memory portion of an on-die memory that is situated on a same die as the processor. Optionally, when the first power is selected to be substantially zero power, data stored in the first memory portion is to be transferred to a system memory prior to providing the substantially zero power to the first memory portion.

The second power may be a selectable one of substantially zero power, full power, and data retain power that is less than the full power and greater than substantially zero power, and the second power is selected based at least in part on comparison of a second idle time associated with execution of the second workload, to a second deep sleep threshold.

Optionally, the computational resource includes static random access memory (SRAM). Optionally, the processor and the computational resource are included in a system on a chip (SOC).

Optionally, the first workload is associated with processing of pedometry data and the second workload is associated with collection of the pedometry data.

In a second example, an apparatus includes a system on a chip that includes a resource. The resource includes a first resource portion and a second resource portion. The first resource portion may be reserved for execution of a first task during a time period and the second resource portion may be reserved for execution of a second task during the time period. The apparatus also includes a processor to determine first power to be provided to the first resource portion during the time period based at least in part on a first idle time associated with the execution of the first task. The first power may be determined independently of second power to be provided to the second resource portion during the time period. The processor may determine the second power based at least in part on a second idle time associated with execution of the second task, where the second power is determined independently of the first power.

The first power may be a selectable one of full power, substantially zero power, and data retain power that is less than the full power and greater than substantially zero power, responsive to a comparison of the first idle time to a first deep sleep threshold. The first power may be selected to be substantially zero power responsive to the first idle time exceeding the first deep sleep threshold. First data stored in the first resource portion may be transferred to the system memory prior to adjustment of power to the first resource portion to substantially zero power. The first power may be selected to be data retain power responsive to the projected first idle time being less than or equal to the first deep sleep threshold and greater than zero. The second power may be a selectable one of full power, data retain power, and substantially zero power responsive a comparison of the second idle time with a second deep sleep threshold.

The second power may be determined to be to substantially zero power responsive to the second projected idle time exceeding a second deep sleep threshold. Optionally, second data stored in the second resource portion is transferred to a system memory prior to adjustment of the second power to substantially zero power. The second power may be selected to be data retain power responsive to the second projected idle time being less than or equal to the second deep sleep threshold and greater than zero.

Optionally, the resource includes a static random access memory (SRAM).

In a third example, a method includes determining, by a processor, first power to be provided to a first resource portion of a resource during a time period, the first resource portion to be reserved for execution of a first task during the time period, where the first power is determined based at least in part on a first idle time associated with execution of the first task during the time period and where the first power is determined independently of second power to be provided to a second resource portion of the resource during the time period. The second resource portion may be reserved for execution of a second task during the time period. The method also includes determining, by the processor, the second power based at least in part on a second idle time associated with execution of the second task during the time period, where the second power is determined independently of the first power. The method may include determining that the first power is to be set to substantially zero responsive to the first idle time exceeding a first deep sleep threshold, and determining that the first power is to be set to a data retain value that is greater than substantially zero and less than full power responsive to the first idle time being less than or equal to the first deep sleep threshold and greater than zero. Responsive to determining that the first power is to be set to substantially zero, the method optionally includes offloading first data stored in the first resource portion to a system memory prior to setting the first power to substantially zero.

Optionally, the first task may be associated with data processing of sensor data and the second task may be associated with data collection of the sensor data.

In a fourth example, at least one storage medium has instructions stored thereon for causing a system to determine first power to be provided to a first resource portion of a resource during a time period. The first resource portion may be reserved for execution of a first task during the time period, and the first power may be determined based at least in part on a first idle time associated with execution of the first task during the time period and the first power is determined independently of second power to be provided to a second resource portion of the resource during the time period. The second resource portion may be reserved for execution of a second task during the time period. Also included in the at least one storage medium are instructions to determine the second power based at least in part on a second idle time associated with execution of the second task during the time period, where the second power is determined independently of the first power. Optionally, also included are instructions to determine that the first power is to be set to substantially zero responsive to the first idle time exceeding a first deep sleep threshold, and to determine that the first power is to be set to a data retain value that is greater than substantially zero and less than full power responsive to the first idle time being less than or equal to the first deep sleep threshold and greater than zero. Included may be instructions to, if it is determined that the first power is to be set to substantially zero, offload first data stored in the first resource portion to a system memory prior to setting the first power to substantially zero.

Optionally, the first task is associated with data processing of sensor data and the second task is associated with data collection of the sensor data.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   an on-die memory unit comprising a plurality of memory banks;
   first circuitry to determine first power to be provided to a first memory bank of the on-die memory unit during a time period, the first memory bank to be reserved for execution of sensor data collection by the processor during the time period, wherein the first power is determined based at least in part on the execution of sensor data collection and independently of execution of sensor data processing by the processor, wherein the first power is a selectable one of full power, data retain power that is smaller than full power and greater than zero power, and substantially zero power, and wherein the first power is selected and applied based at least in part on a comparison of a first idle time associated with the execution of sensor data collection to a first deep sleep threshold; and
   second circuitry to determine second power to be provided to a second memory bank of the on-die memory unit during the time period, the second memory bank to be reserved for the execution of sensor data processing by the processor during the time period, wherein the second power is determined based at least in part on the execution of sensor data processing and independently of the execution of sensor data collection, and wherein the on-die memory unit is situated on a same die as the processor.

2. The processor of claim 1, wherein when the first power is selected to be substantially zero power, data stored in the first memory portion is to be transferred to a system memory prior to providing the substantially zero power to the first memory portion.

3. The processor of claim 1, wherein the execution of sensor data collection comprises collection of pedometry data indicating a number of steps taken by a user.

4. The processor of claim 1, wherein the second power is a selectable one of substantially zero power, full power, and data retain power that is less than the full power and greater than substantially zero power, and wherein the second power is selected based at least in part on comparison of a second idle time associated with the execution of sensor data processing to a second deep sleep threshold.

5. The processor of claim 1, wherein the on-die memory unit comprises static random access memory (SRAM).

6. The processor of claim 1, wherein the processor and the on-die memory unit are included in a system on a chip (SOC).

7. An apparatus comprising:
a system on a chip including:
a memory unit comprising a first memory portion and a second memory portion, wherein the first memory portion is to be reserved for execution of sensor data collection during a time period and the second memory portion is to be reserved for execution of sensor data processing during the time period; and
a processor to:
determine first power to be provided to the first memory portion during the time period based at least in part on a first idle time associated with the execution of sensor data collection, wherein the first power is determined independently of second power to be provided to the second memory portion during the time period, wherein the first power is a selectable one of full power, substantially zero power, and data retain power that is less than the full power and greater than substantially zero power, and wherein the first power is selected and applied based at least in part on a comparison of the first idle time to a first deep sleep threshold; and
determine the second power based at least in part on a second idle time associated with execution of sensor data processing, wherein the second power is determined independently of the first power.

8. The apparatus of claim 7, wherein the first power is selected to be substantially zero power responsive to the first idle time exceeding the first deep sleep threshold.

9. The apparatus of claim 8, wherein first data stored in the first memory portion is transferred to a system memory prior to adjustment of power to the first resource portion to substantially zero power, wherein the system memory is operatively coupled to the system on a chip.

10. The apparatus of claim 7, wherein the first power is selected to be data retain power responsive to the projected first idle time being less than or equal to the first deep sleep threshold and greater than zero.

11. The apparatus of claim 7, wherein the second power is a selectable one of full power, data retain power, and substantially zero power responsive a comparison of the second idle time with a second deep sleep threshold.

12. The apparatus of claim 11, wherein the second power is determined to be to substantially zero power responsive to the second projected idle time exceeding a second deep sleep threshold.

13. The apparatus of claim 12, wherein the second data stored in the second resource portion is transferred to the system memory prior to adjustment of the second power to substantially zero power.

14. The apparatus of claim 11, wherein the second power is selected to be data retain power responsive to the second projected idle time being less than or equal to the second deep sleep threshold and greater than zero.

15. A method comprising:
determining, by a processor, first power to be provided to a first memory portion of an on-die memory unit during a time period, the first memory portion to be reserved for execution of a data collection task during the time period, wherein the first power is determined based at least in part on a first idle time associated with execution of the data collection task during the time period, wherein the on-die memory unit is situated on a same die as the processor, and wherein the first power is determined independently of second power to be provided to a second memory portion of the on-die memory unit during the time period, the second memory portion to be reserved for execution of a data processing task during the time period, wherein the first power is a selectable one of full power, substantially zero power, and data retain power that is less than the full power and greater than substantially zero power, and wherein the first power is selected and applied based at least in part on a comparison of the first idle time to a first deep sleep threshold; and
determining, by the processor, the second power based at least in part on a second idle time associated with execution of the data processing task during the time period, wherein the second power is determined independently of the first power.

16. The method of claim 15, wherein the data processing task is associated with processing of sensor data and the data collection task is associated with collection of the sensor data.

17. The method of claim 15, further comprising:
determining that the first power is to be set to substantially zero responsive to the first idle time exceeding a first deep sleep threshold; and
determining that the first power is to be set to a data retain value that is greater than substantially zero and less than full power responsive to the first idle time being less than or equal to the first deep sleep threshold and greater than zero.

18. The method of claim 17, further comprising, if it is determined that the first power is to be set to substantially zero, offloading first data stored in the first memory portion to a system memory prior to setting the first power to substantially zero.

* * * * *